United States Patent
Marchand

(10) Patent No.: US 12,323,415 B2
(45) Date of Patent: Jun. 3, 2025

(54) METHOD FOR AUTHORIZING ACCESS TO AN INSTRUMENT

(71) Applicant: STRATOCORE S.A.S., St Piat (FR)

(72) Inventor: Mathieu Marchand, Atlanta, GA (US)

(73) Assignee: Stratocore S.A.S., St Piat (FR)

( * ) Notice: Subject to any disclaimer, the term of this patent is extended or adjusted under 35 U.S.C. 154(b) by 175 days.

(21) Appl. No.: 17/800,354

(22) PCT Filed: Feb. 17, 2021

(86) PCT No.: PCT/US2021/018288
§ 371 (c)(1),
(2) Date: Jan. 4, 2023

(87) PCT Pub. No.: WO2021/167925
PCT Pub. Date: Aug. 26, 2021

(65) Prior Publication Data
US 2024/0031359 A1      Jan. 25, 2024

Related U.S. Application Data

(60) Provisional application No. 62/977,602, filed on Feb. 17, 2020.

(51) Int. Cl.
*H04L 9/40* (2022.01)

(52) U.S. Cl.
CPC ...... *H04L 63/0838* (2013.01); *H04L 63/0846* (2013.01)

(58) Field of Classification Search
CPC .. H04L 63/0838; H04L 63/0846; G06F 21/35
See application file for complete search history.

(56) References Cited

U.S. PATENT DOCUMENTS

| | | | | |
|---|---|---|---|---|
| 7,552,467 B2 * | 6/2009 | Lindsay | ............... | G07F 7/1025 |
| | | | | 713/168 |
| 10,453,159 B2 * | 10/2019 | Kapczynski | ......... | G06Q 50/265 |
| 10,540,493 B1 * | 1/2020 | Kras | ....................... | G09B 9/00 |

(Continued)

OTHER PUBLICATIONS

EPO: "European Search Report"; Dec. 7, 2023; (Search Report in related European case).

*Primary Examiner* — Khoi V Le
(74) *Attorney, Agent, or Firm* — Bryan W. Bockhop; Bockhop Intellectual Property Law, LLC

(57) ABSTRACT

In a method for controlling access to an instrument (110) that is coupled to an interlock (112) device that controls access to the instrument (110), in which a user time-based one-time password that is unique to each user or project is periodically generated (312). A set of instrument time-based one-time passwords that correspond to each user time-based one-time password for the instrument is periodically generated (320). The set of instrument time-based one-time passwords is stored in the interlock device. The user time-based one-time password is received from a user (316). Only when the user time-based one-time password received from the user corresponds to one of the set of instrument time-based one-time passwords that is stored by the interlock device (326) then the interlock device is instructed to allow access to the instrument by the user (328). Parameters relating to use of the instrument by the user are recorded.

13 Claims, 2 Drawing Sheets

(56) References Cited

U.S. PATENT DOCUMENTS

2012/0233675 A1* 9/2012 Hird .................... H04L 63/0838
                                                        726/6
2018/0329676 A1   11/2018 Williams et al.
2021/0383624 A1* 12/2021 Hoyer ..................... G07C 9/22

* cited by examiner

METHOD FOR AUTHORIZING ACCESS TO AN INSTRUMENT

BACKGROUND OF THE INVENTION

1. Field of the Invention

The present invention relates to access and usage tracking systems and, more specifically, to a system that employs a one-time pin in controlling access.

2. Description of the Related Art

Tracking usage of items such as laboratory instruments is often necessary for sponsored research grant compliance and funds allocation. It can also be useful for such activities as making new equipment purchasing decisions and planning preventative maintenance. Typical usage tracking systems require a user to enter a username and a password on a keyboard to gain access to the item. However, authentication at the level of the instrument can be difficult for several reasons, such as:
- Computers controlling instruments can be used to control access but may not have network access—especially after XP 2014 end of life (EOL). This was amplified by Windows 7 EOL in January 2020. (context: lots of instrument are running older operating systems;
- Proxy servers can be used, but there are some infrastructure overheads for such a setup. Also, one cannot proxy easily the required LDAP/AD connections and such proxying can cause several security issues to arise;
- SAML authentication can be proxied, but it requires a browser. However, running supporting browser-based authentication may not be possible, especially given security issues relating to EOL/older operating systems;
- Interlock based access control usually requires a kiosk or dedicated computer with a browser to log in and turn on/off the interlock. Such a kiosk can be expensive, heavy and difficult to deploy (which prevents from scaling to 100s/1000s of instruments). Also, user experience can be convoluted; and
- A smart phone cannot be used easily because typing a password on a touchscreen is not user friendly and many labs will lack network connectivity due to the interference generated by wireless signals.

A time-based one-time password (TOTP) is a temporary passcode generated by an algorithm that uses the current time as an authentication factor. In existing systems, TOTPs are commonly used for two-factor authentication, in which the user initially enters a username and password, and is then sent a TOTP via email or telephone. Once the user enters the TOTP, then access is granted to the user.

Therefore, there is a need for system for access control and quick authentication in laboratory environments.

SUMMARY OF THE INVENTION

In one aspect, the invention is a method for controlling access to an instrument that is coupled to an interlock device that controls access to the instrument, in which a user time-based one-time password that is unique to each user or project is periodically generated. A set of instrument time-based one-time passwords that correspond to each user time-based one-time password for the instrument is periodically generated. The set of instrument time-based one-time passwords is stored in the interlock device. The user time-based one-time password is received from a user. Only when the user time-based one-time password received from the user corresponds to one of the set of instrument time-based one-time passwords that is stored by the interlock device then the interlock device is instructed to allow access to the instrument by the user. Parameters relating to use of the instrument by the user are recorded.

DETAILED DESCRIPTION OF THE INVENTION

Figure 1:
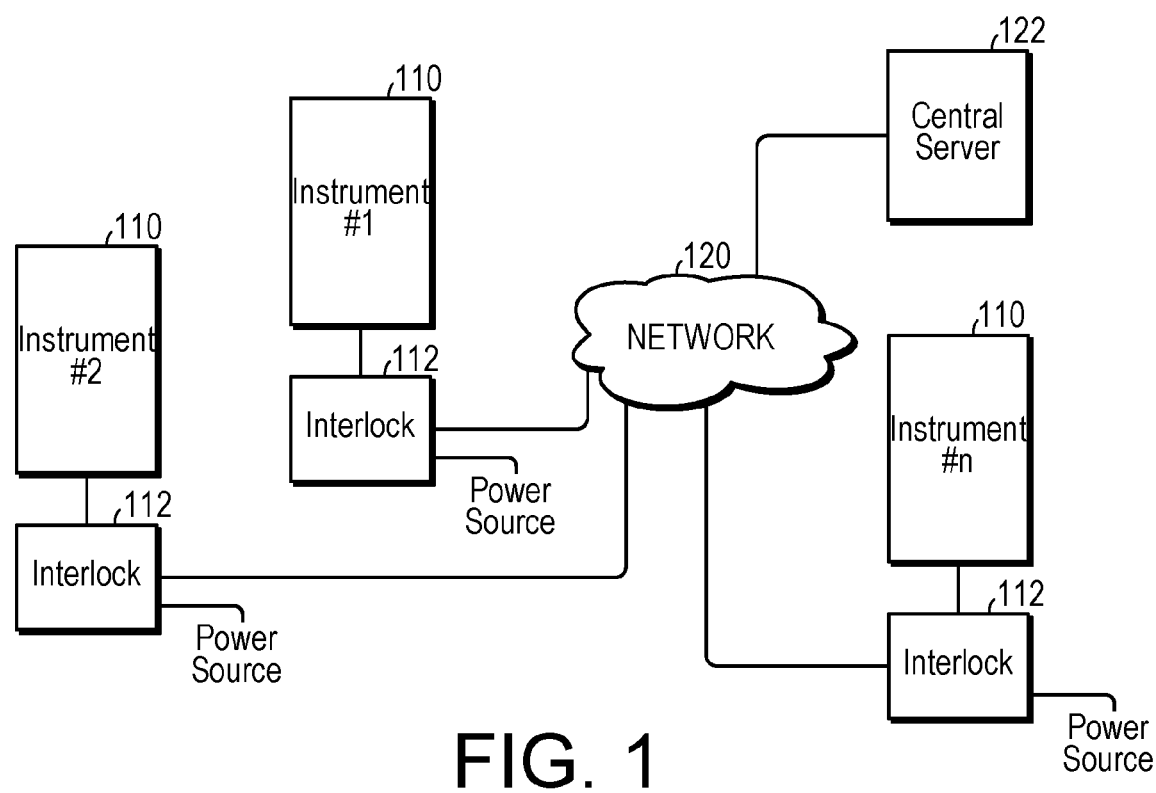
FIG. 1 is a schematic diagram showing one embodiment of a password-less instrument usage tracking system.

A preferred embodiment of the invention is now described in detail. Referring to the drawings, like numbers indicate like parts throughout the views. Unless otherwise specifically indicated in the disclosure that follows, the drawings are not necessarily drawn to scale. The present disclosure should in no way be limited to the exemplary implementations and techniques illustrated in the drawings and described below. As used in the description herein and throughout the claims, the following terms take the meanings explicitly associated herein, unless the context clearly dictates otherwise: the meaning of "a," "an," and "the" includes plural reference, the meaning of "in" includes "in" and "on." Also, as used herein, "global computer network" includes the Internet.

As shown in FIG. 1, in one representative embodiment, a system for controlling access to items (such as laboratory instruments 110) includes an interlock device 112 that is used to control access to each item and to track usage of the item. Controlling access can be done by hardwiring the item to the interlock 112 so that the item cannot receive power unless the interlock 112 couples the item to a power supply. The interlock 112 also has the ability to track usage of the item. For example, the interlock 112 can include a digital ammeter and an internal clock to measure and report the time that a user had access to the item and how much power was consumed by the item during that time. The interlock 112 can be in communication with a central server 122 via a network (which in some embodiments is the global computer network) to report access time and other information about the item.

Figure 2:
FIG. 2 is a schematic diagram showing one embodiment of a user's device for generating a TOTP.

The central server 122 runs a Time-based One-Time Password (TOTP) algorithm (e.g., the RFC 6238 TOTP algorithm) so as to generate periodically (e.g., every 15 seconds) a TOTP for each user or project. Each user or project has a unique key associated with it. Independently of the central server 122, as shown in FIG. 2, a user's device 210 (such as a smart phone) is running the TOTP algorithm on a app. The app generates the TOTP based on the user's key or a key corresponding to a project to which the user has access. The TOTP can be displayed as a number 212 or as a visual code 214 (such as a QR code, as shown).

Returning to FIG. 1, the interlock 112 includes a data entry device, such as a keypad or optical code reader, through which the user enters the TOTP showing on the user's device 210. The interlock 112 transmits the TOTP to the server 122, which compares it to a table of TOTPs that have been generated from keys that have access to the item connected to that interlock 112. If the key from the interlock 112 is found, then the server transmits an authorization for access to the interlock 112 and the user is granted access to the item.

Figure 3A:
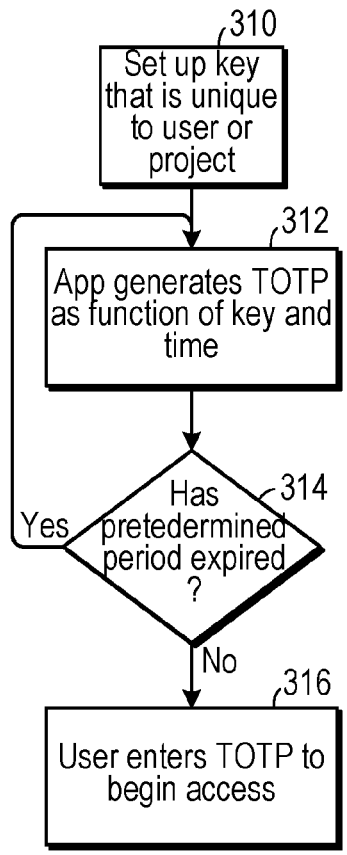
FIGS. 3A and 3B are flow charts showing one method of embodying a password-less instrument usage tracking system.
Figure 3B:
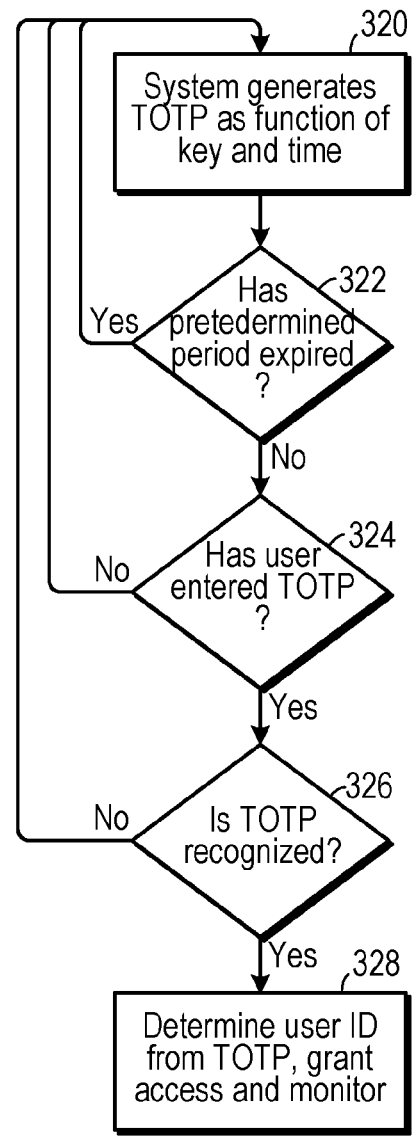

As shown in FIG. 3A, the user's device initially sets up a key that is unique for the user or the project 310 and the key is stored by the server. This is a one-time set-up. When the user desires access to an item, then the user will run the TOTP app 312, which will generate the TOTP as a function of the key and the current time. If a predetermined amount of time has expired 312, then the app will regenerate the key to reflect the current time frame. (Typically, the TOTP app will be updated every 15 seconds.) The user then enters the displayed TOTP into the interlock 316.

The server generates the TOTPs for each key 320 as a function of time and the key and will regenerate the TOTPs at the expiration of each time period 322. The server will wait to receive a TOTP entered by the user on an interlock 324. If a TOTP is recognized as valid by the server 326, then the server will determine the user's (or the project's) identification based on the TOTP—essentially by reversing the TOTP-generating algorithm based on the time of receipt—and will grant access to the device 328. The server will also record the user's identification, the time access began, the time access ended and any other relevant usage parameters (e.g., the amount of electricity consumed by the device, etc.) received from the interlock.

Although specific advantages have been enumerated above, various embodiments may include some, none, or all of the enumerated advantages. Other technical advantages may become readily apparent to one of ordinary skill in the art after review of the following figures and description. It is understood that, although exemplary embodiments are illustrated in the figures and described below, the principles of the present disclosure may be implemented using any number of techniques, whether currently known or not. Modifications, additions, or omissions may be made to the systems, apparatuses, and methods described herein without departing from the scope of the invention. The components of the systems and apparatuses may be integrated or separated. The operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. It is intended that the claims and claim elements recited below do not invoke 35 U.S.C. § 112(f) unless the words "means for" or "step for" are explicitly used in the particular claim. The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A method for controlling access to an instrument by a plurality of users, comprising the steps of:

(a) hardwiring an interlock to a power supply so that the interlock is configured to selectively electrically couple the power supply to a device coupled thereto and connecting the interlock to a central server via a network so that the interlock is in data communication with the central server, the interlock including a data entry device;

(b) hardwiring the instrument to the interlock so that the instrument receives power only when the interlock couples the instrument to the power supply;

(c) setting up a unique key for each of the plurality of users;

(d) running an algorithm on a user device used by a selected one of the plurality of users that generates a user time-based one-time password that is a function of the key that has been set up for the selected one of the plurality of users and a current time at which access is requested;

(e) periodically generating on the central server a set of instrument time-based one-time passwords for the instrument that correspond to each user of the plurality of users using the algorithm wherein each instrument time-based one-time passwords of the set is generated using the algorithm and is a function of the unique key set up for each user and the current time, and storing the set of instrument time-based one-time passwords;

(f) receiving at the data entry device from the selected one of the plurality of users the user time-based one-time password generated by the algorithm on the user device of the selected one of the plurality of users;

(g) only when the user time-based one-time password received from the selected one of the plurality of users at the data entry device from corresponds to one of the set of instrument time-based one-time passwords then instructing the interlock device to couple the instrument to the power supply; and (h) identifying the selected one of the plurality of users and recording by the central server parameters relating to use of the instrument by the selected one of the plurality of users.

2. The method of claim 1, wherein the step of running an algorithm on a user device comprises running an app on a smart phone.

3. The method of claim 1, wherein at least one of the parameters recorded by the central server comprises a total amount of electricity consumed by the selected one of the plurality of users while using the instrument.

4. The method of claim 1, wherein at least one of the parameters recorded by the central server comprises an amount of time that the selected one of the plurality of users used the instrument.

5. The method of claim 1, wherein the step of identifying the selected one of the plurality of users comprises the step of applying a reversed version of the algorithm to the user time-based one-time password received by the data entry device.

6. The method of claim 1, wherein the user time-based one-time password comprises a numerical code and wherein the step of receiving at the data entry device from the selected one of the plurality of users-the user time-based one-time password comprises receiving a code entered on a keypad device that has been coupled to the interlock.

7. The method of claim 1, wherein the user time-based one-time password comprises a QR code and wherein the step of receiving at the data entry device from the selected one of the plurality of users-the user time-based one-time password comprises receiving a code entered on an optical code reader that has been coupled to the interlock.

8. The method of claim 1, wherein the central server regenerates the instrument time-based one-time passwords every 15 seconds.

9. A method for controlling access to an instrument by a plurality of users, comprising the steps of:
  (a) hardwiring an interlock to a power supply so that the interlock is configured to selectively electrically couple the power supply to a device coupled thereto and connecting the interlock to a central server via a network so that the interlock is in data communication with the central server, the interlock including a data entry device;
  (b) hardwiring the instrument to the interlock so that the instrument receives power only when the interlock couples the instrument to the power supply;
  (c) setting up a unique key for each of the plurality of users;
  (d) running an algorithm on a smart phone used by a selected one of the plurality of users that generates a user time-based one-time password that is a function of the key that has been set up for the selected one of the plurality of users and a current time at which access is requested;
  (e) periodically generating on the central server a set of instrument time-based one-time passwords for the instrument that correspond to each user of the plurality of users using the algorithm wherein each instrument time-based one-time passwords of the set is generated using the algorithm and is a function of the key set up for each user and the current time, and storing the set of instrument time-based one-time passwords;
  (r) receiving at the data entry device from the selected one of the plurality of users a user the user time-based one-time password generated by the algorithm on the user device of the selected one of the plurality of users;
  (g) only when the user time-based one-time password received from the selected one of the plurality of users at the data entry device from corresponds to one of the set of instrument time-based one-time passwords then instructing the interlock device to couple the instrument to the power supply;
  (h) determining, by the central server, an identification of the selected one of the plurality of users by applying a reversed version of the algorithm to the user time-based one-time password received by the data entry device; and
  (h) identifying the selected one of the plurality of users and recording by the central server a total amount of electricity consumed by the selected one of the plurality of users while using the instrument and an amount of time that the selected one of the plurality of users used the instrument.

10. The method of claim 9, wherein the user time-based one-time password comprises a numerical code and wherein the step of receiving at the data entry device from the selected one of the plurality of users-the user time-based one-time password comprises receiving a code entered on a keypad device that has been coupled to the interlock.

11. The method of claim 9, wherein the user time-based one-time password comprises a QR code and wherein the step of receiving at the data entry device from the selected one of the plurality of users-the user time-based one-time password comprises receiving a code entered on an optical code reader that has been coupled to the interlock.

12. The method of claim 9, wherein the step of identifying the selected one of the plurality of users comprises the step of applying a reversed version of the algorithm to the user time-based one-time password received by the data entry device.

13. The method of claim 9, wherein the central server regenerates the instrument time-based one-time passwords every 15 seconds.

\* \* \* \* \*